(12) United States Patent
Wang et al.

(10) Patent No.: US 12,715,280 B2
(45) Date of Patent: Aug. 25, 2026

(54) COOLING SYSTEM FOR A DRIVE MOTOR OF AN ALTERNATIVE FUEL VEHICLE

(71) Applicant: SAIC MOTOR CORPORATION LIMITED, Shanghai (CN)

(72) Inventors: Jian Wang, Shanghai (CN); Meng Hu, Shanghai (CN); Hanni Zhang, Shanghai (CN); Shaorui Huang, Shanghai (CN); Yaru Qu, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 740 days.

(21) Appl. No.: 17/801,532

(22) PCT Filed: Apr. 26, 2020

(86) PCT No.: PCT/CN2020/086988
§ 371 (c)(1),
(2) Date: Aug. 23, 2022

(87) PCT Pub. No.: WO2021/217294
PCT Pub. Date: Nov. 4, 2021

(65) Prior Publication Data
US 2023/0128655 A1 Apr. 27, 2023

(51) Int. Cl.
*H02K 1/20* (2006.01)
*B60K 11/02* (2006.01)
*H02K 5/20* (2006.01)

(52) U.S. Cl.
CPC ................ *B60K 11/02* (2013.01); *H02K 1/20* (2013.01); *H02K 5/203* (2021.01)

(58) Field of Classification Search
CPC .. H02K 1/20; H02K 3/24; H02K 5/20; H02K 5/203; H02K 9/19; H02K 9/193; B60K 11/02
See application file for complete search history.

(56) References Cited

U.S. PATENT DOCUMENTS

2010/0264760 A1* 10/2010 Matsui ..................... H02K 9/19 310/54
2012/0080964 A1* 4/2012 Bradfield ................. H02K 1/20 310/58

(Continued)

FOREIGN PATENT DOCUMENTS

JP 2004180376 A * 6/2004
JP 2006191702 A 7/2006

(Continued)

OTHER PUBLICATIONS

Hosoi, Machine Translation of JP2012050317, Mar. 2012 (Year: 2012).*

(Continued)

*Primary Examiner* — Eric Johnson
(74) *Attorney, Agent, or Firm* — Nixon Peabody LLP

(57) ABSTRACT

The present application discloses a cooling system for a drive motor for an alternative fuel vehicle, the drive motor comprising a motor housing, a stator core arranged in the motor housing, and a stator winding arranged inside the stator core, wherein the stator core is formed by a lamination of a core punch, characterized in that the cooling system comprises: a flow guiding configuration for directing a coolant flow around an outer periphery of the stator core to cool the stator core, the flow guiding configuration comprising alternately arranged diversion regions and convergence regions; one or more coolant inlets for introducing the coolant from outside the cooling system; a flow guiding hood for directing the coolant flow to the ends of the stator windings to cool the ends of the stator windings; and a convergence port for allowing the coolant in the flow guiding configuration to pass so that the coolant flows from the outer periphery of the stator core to the flow guiding hood.

8 Claims, 11 Drawing Sheets

(56) References Cited

U.S. PATENT DOCUMENTS

| | | | | |
|---|---|---|---|---|
| 2014/0346905 | A1* | 11/2014 | Matsui | H02K 9/19 310/54 |
| 2018/0278109 | A1 | 9/2018 | Murata | |
| 2021/0129660 | A1* | 5/2021 | Bradfield | F16H 57/0465 |

FOREIGN PATENT DOCUMENTS

| | | | | |
|---|---|---|---|---|
| JP | 2009022145 | A | | 1/2009 |
| JP | 2012050317 | A | * | 3/2012 |
| JP | 2014230401 | A | | 12/2014 |
| JP | 2017093207 | A | | 5/2017 |
| JP | 2019110664 | A | | 7/2019 |

OTHER PUBLICATIONS

Matsui, Machine Translation of JP2004180376, Jun. 2004 (Year: 2004).*

Japanese Office Action for App. No. 2022-553102, mailed Aug. 22, 2023 (3 pages).

* cited by examiner

COOLING SYSTEM FOR A DRIVE MOTOR OF AN ALTERNATIVE FUEL VEHICLE

CROSS-REFERENCE TO RELATED APPLICATIONS

This application is the United States National Stage of International Application No.: PCT/CN2020/086988, filed Apr. 26, 2020, the entire disclosure of which is herein incorporated by reference.

FIELD OF THE INVENTION

The present invention relates to a cooling system for a drive motor, and specifically to a cooling system for a drive motor for an alternative fuel vehicle.

BACKGROUND OF THE INVENTION

Alternative fuel vehicles have become the mainstream direction of future automotive technology development, with the rapid development of alternative fuel vehicle drive technology, the market has gradually increased the requirements for all aspects of the alternative fuel vehicle drive system. As one of the core components of the drive system, the drive motor needs to meet the increasingly stringent vehicle drive requirements under the condition of continuously reducing the size, weight and cost, which poses a huge challenge to the cooling system of the drive motor. Conventional drive motor cooling methods are water-cooled or oil-cooled. In the water-cooled solution, the coolant does not come into direct contact with the heat-generating parts of the drive motor, and the cooling efficiency is low, which is not suitable for high power density drive motors. In the oil-cooled solution, the cooling oil is sprayed to the end of the stator winding of the drive motor through the oil hole of the oil injection tube, and the heat of the stator winding of the drive motor is directly removed, and the cooling efficiency is high. However, the distribution of the oil holes on the oil injection tube and its own processing accuracy will affect the oil injection efficiency of the oil injection tube, which in turn directly affects the cooling effect of the cooling oil on the drive motor. In addition, how to guarantee the sealing effect at the entrance of the oil injection tube has become one of the challenges in the oil cooling solution. CN203747551U discloses a liquid-cooled housing for an electric bus drive motor. The housing includes an inner cylinder, an outer cylinder, and a liquid-cooled chamber between the inner cylinder and the outer cylinder. A water inlet and a water outlet are arranged on the outer cylinder. A plurality of tendons are arranged along the axial direction between the inner barrel and the outer barrel. The fascia divides the liquid-cooled chamber into a plurality of interoperable circulation waterways. A ridge-shaped heat sink is arranged in this circulation waterway.

CN104518614A discloses a liquid-cooled cooling device for a drive motor. The cooling device includes: a first housing body, a second housing body, a water inlet and a water outlet. A plurality of cavities are arranged between an inner wall and an outer wall of the first housing body in an axial direction. A recess for connecting adjacent cavities is arranged on the end face of the first housing body. The adjacent recesses are located at different ends of the first housing body to form an S-shaped channel together with the plurality of cavities. A plurality of hollow projections are arranged on the outer side of the inner wall and on the inner side of the outer wall of the first housing body.

In summary, reducing the size and weight of the drive motor, improving the cooling capacity and reliability of the cooling system as well as reducing the cost of the cooling system are the technical problems to be solved.

SUMMARY

In order to solve the above technical problems, the present application discloses a cooling system for a drive motor of an alternative fuel vehicle, the features of which are recorded in the claims.

Based on the requirement of miniaturization and light weight of drive motors for alternative fuel vehicles, this application proposes a cooling solution in which the coolant directly contacts the stator core and the end of the stator winding. This application removes the additional cooling housing used in the cooling system of a conventional drive motor, allowing the cooling capacity to be increased and the size of the motor to be reduced.

Based on the requirement of reliability of drive motors for alternative fuel vehicles, in this application, the stator is formed by a lamination of the core punch, which ensures uniform coolant shunting while reducing the flow resistance of the coolant. The cooling structure for the end of the stator winding consists of a combination of a flow guiding hood and an flow accumulating hood, which is open cooling without strict sealing requirements and without the risk of clogging. The combination of the two increases the reliability of the cooling system.

Based on the low-cost requirements of drive motors for alternative fuel vehicles, in this application, the direct cooling structure is formed by staggering the core punches without additional machining of the stator, and the proposed direct cooling structure for the stator requires only up to two different core punches and no separate cooling housing, which makes the mechanical structure simpler and does not require additional machining of the die. Cooling structures for the ends of the stator windings (e.g., flow guiding hood and flow accumulating hood) have wider material requirements and lower machining accuracy requirements. The combination of the two can reduce costs

BRIEF DESCRIPTION OF THE DRAWINGS

The foregoing and other aspects of the present application will be more fully understood and appreciated by the following detailed description made with reference to the accompanying drawings, in which.

DETAILED DESCRIPTION OF EMBODIMENTS

To assist those skilled in the art in understanding precisely the subject matter claimed to be protected by this application, specific embodiments of the application are described in detail below in connection with the accompanying drawings.

Figure 1:
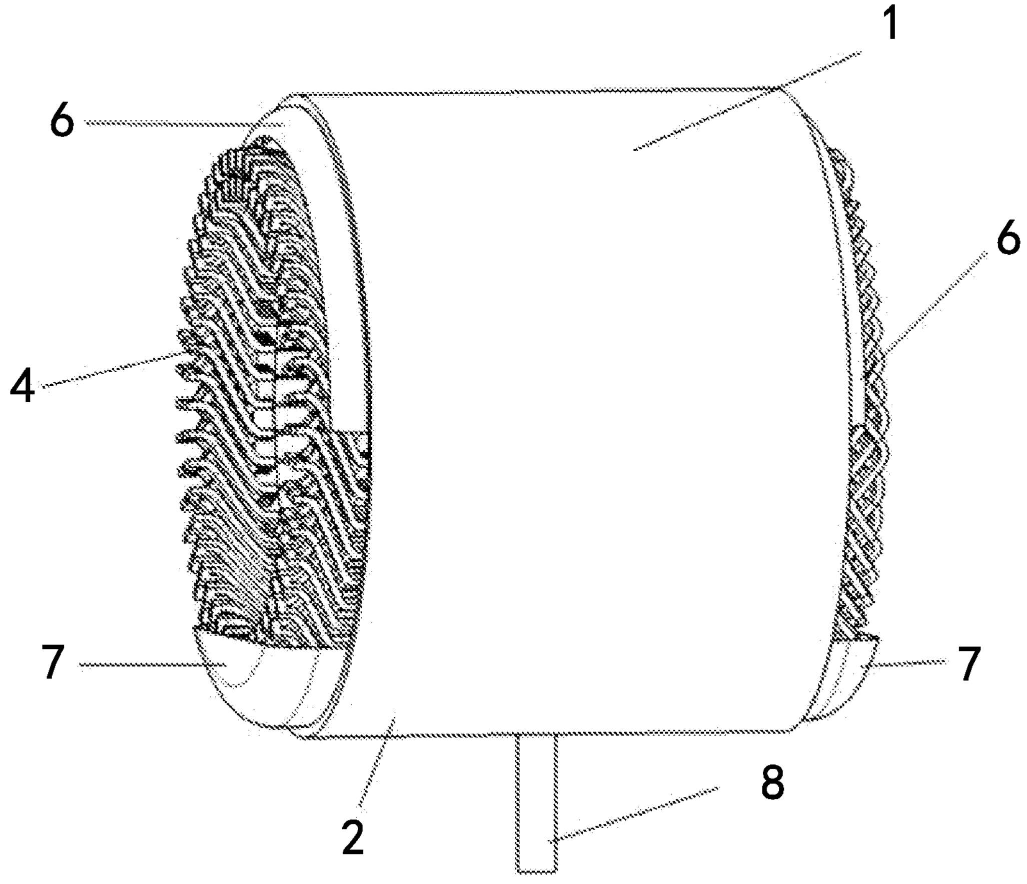
FIG. 1 is a perspective view of a cooling system for a drive motor of an alternative fuel vehicle according to a typical embodiment of the present application.

FIG. 1 is a perspective diagram of a cooling system for a drive motor for an alternative fuel vehicle according to an exemplary embodiment of the present application. The transverse drive motor 1 includes a motor housing 2, a stator core 3 arranged in the motor housing 2 (see FIG. 2) and a stator winding 4 arranged inside the stator core 3. The cooling system includes a flow guiding configuration 5 (see FIG. 2), a flow guiding hood 6, a flow accumulating hood 7, a coolant inlet 8, a convergence port 9 (see FIG. 2) and a coolant outlet 10 (see FIG. 10).

Figure 2:
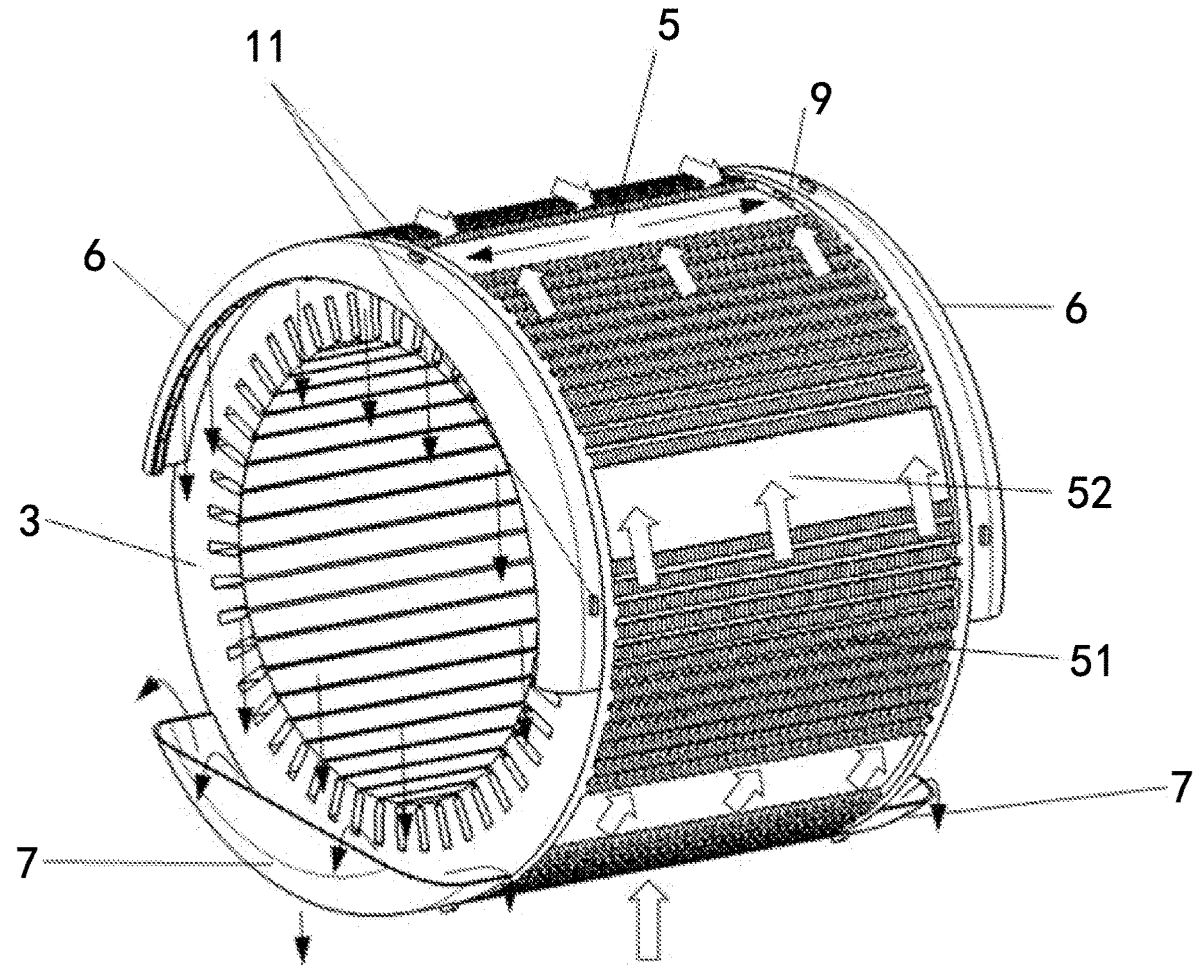
FIG. 2 is a diagram of the direction of the coolant flow in the cooling system of FIG. 1.

FIG. 2 is a diagram of the direction of the coolant flow in the cooling system of FIG. 1. The flow guiding configuration 5 is positioned at the outer periphery of the stator core 3 of the drive motor 1 or at the inner periphery of the motor housing 2 for directing the coolant flow through the outer periphery of the stator core 3 to cool the stator core 3. The flow guiding configuration 5 comprises alternately arranged diversion regions 51 and convergence regions 52.

The flow guiding hood 6 is mounted to the end pressure plate on the end of the motor housing 2 or stator core 3 by means of a mounting catch 11 arranged thereon. The flow guiding hood 6 is used to direct the coolant flow flowing into the flow guiding hood towards the ends of the stator windings 4 to cool them. The flow guiding hood 6 covers only a portion of the end portion of the stator core 3, and the flow guiding hood 6 extends along the axial direction of the stator core 3 for a distance less than the end portion of the stator winding 4 extends along the axial direction of the stator core 3 outside the stator core 3, thereby allowing the coolant flowing from the flow guiding hood 6 to fully contact the end portion of the stator winding 4 and improving cooling efficiency.

The flow accumulating hood 7 is mounted to the motor housing 2 or to an end pressure plate on the end of the stator core 3 by means of a mounting catch 11 arranged thereon, extending away from the end of the stator core 3. The flow accumulating hood 7 is used to receive the coolant falling from the end of the stator winding 4. The flow accumulating hood 7 covers only a lower portion of the end portion of the stator core 3, and the flow accumulating hood 7 extends along the axial direction of the stator core 3 for a greater distance than the end portion of the stator winding 4 extends along the axial direction of the stator core 3 outside the stator core 3, such that the coolant falling from the end portion of the stator winding 4 is substantially received by the flow accumulating hood 7.

A coolant inlet 8 is arranged in a convergence region 52 in the inflow structure for introducing the coolant from outside the cooling system to the outer periphery of the stator core 3. The convergence port 9 is used to allow the coolant to flow from the outer circumference of the stator core 3 to the flow guiding hood 6. One or more coolant outlets 10 are arranged at the bottom of the flow accumulating hood 7 for exporting the coolant from the flow accumulating hood to avoid prolonged immersion of the coolant in the drive motor 1 during deactivation of the drive motor 1.

The coolant enters the motor housing 2 via the coolant inlet 8 under the action of the high-pressure pump and subsequently flows on the outer periphery of the stator core 3 to the convergence port 9 and to the flow guiding hood 6, from which it finally descends to the end of the stator winding 4. The coolant falling from the end of the stator winding 4 is substantially received by the flow accumulating hood 7. The coolant can then be exported from the cooling system via the coolant outlet 10.

Figure 3:
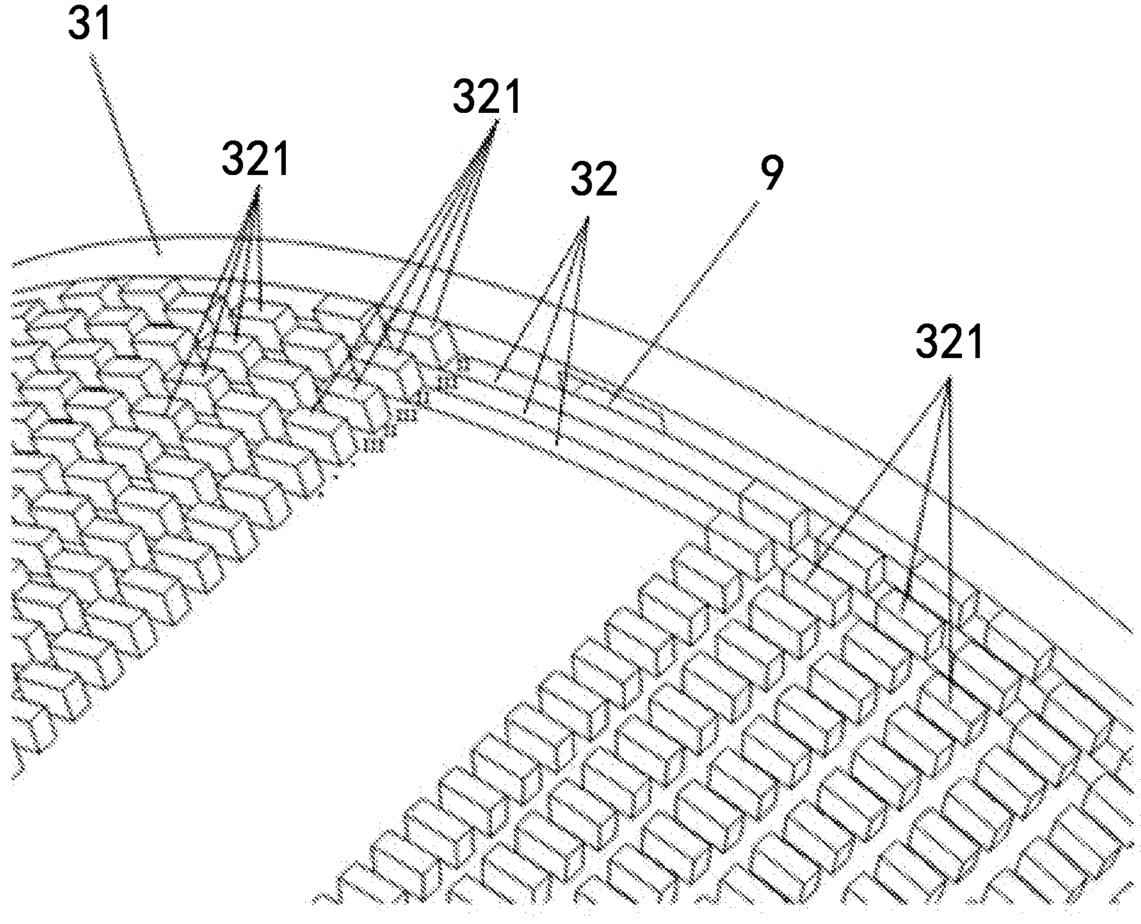
FIG. 3 is a partially enlarged diagram of the flow guiding configuration and convergence port of the cooling system for the drive motor of FIG. 1.

FIG. 3 is a partially enlarged diagram of a flow-conducting structure of the cooling system of the drive motor of FIG. 1. In the case where the flow guiding configuration 5 is formed by a slot or hole arranged in the stator core 3, the flow guiding configuration 5 is formed by the stator core 3 by a lamination of a first core punch 32, while the convergence port 9 may be formed by a lamination of a second core punch 31. In this embodiment, the end of the stator core 3 (i.e., the convergence port 9) is formed by the first core punch 31, while in other embodiments, the end of the stator core 3 (i.e., the convergence port 9) may be formed by a stator core end pressure plate arranged with a hole or slot. The portion between the ends of the stator core 3 (i.e., the flow guiding configuration 5) is formed by alternating stacks of second core punches 32. The adjacent second core punches are deflected by a first circumferential angle between them along the circumference direction of the stator core 3.

Figure 4A:
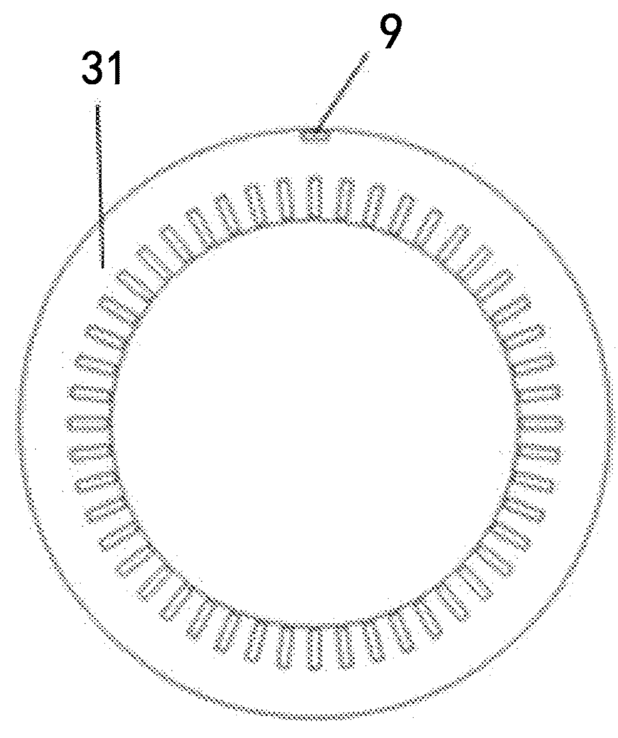
FIGS. 4*a* and 4*b* are diagrams of the core punch of the drive motor of FIG. 1.

FIG. 4*a* is a diagram of a first core punch. The first core punch 31 is annular in shape and is arranged with holes extending along its circumference direction near the outer periphery for forming a convergence port 9. One or more convergence ports 9 may be arranged.

Figure 4B:
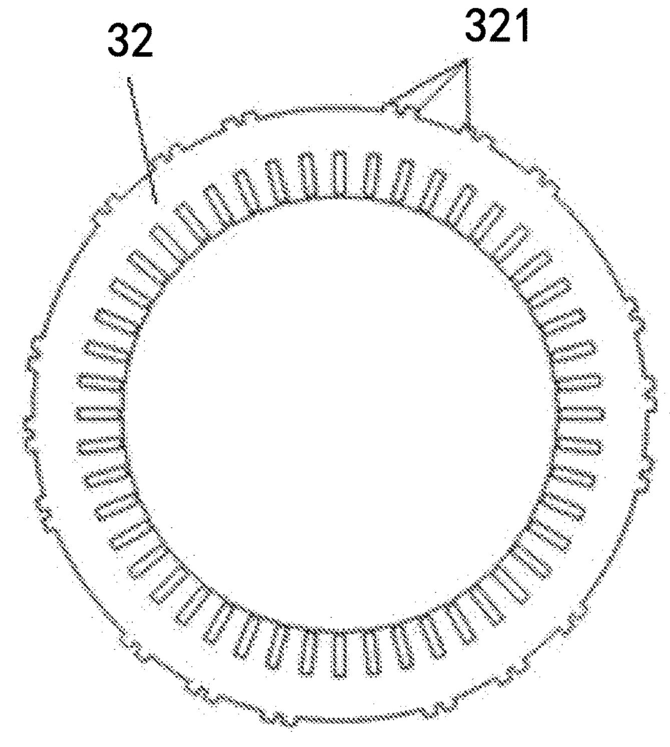

FIG. 4*b* is a diagram of a second core punch. The second core punch 32 is annular in shape and is arranged with tabs 321 protruding radially on the outer periphery and slots arranged between the tabs for forming a diversion region 51 and a convergence region 52.

Figure 5:
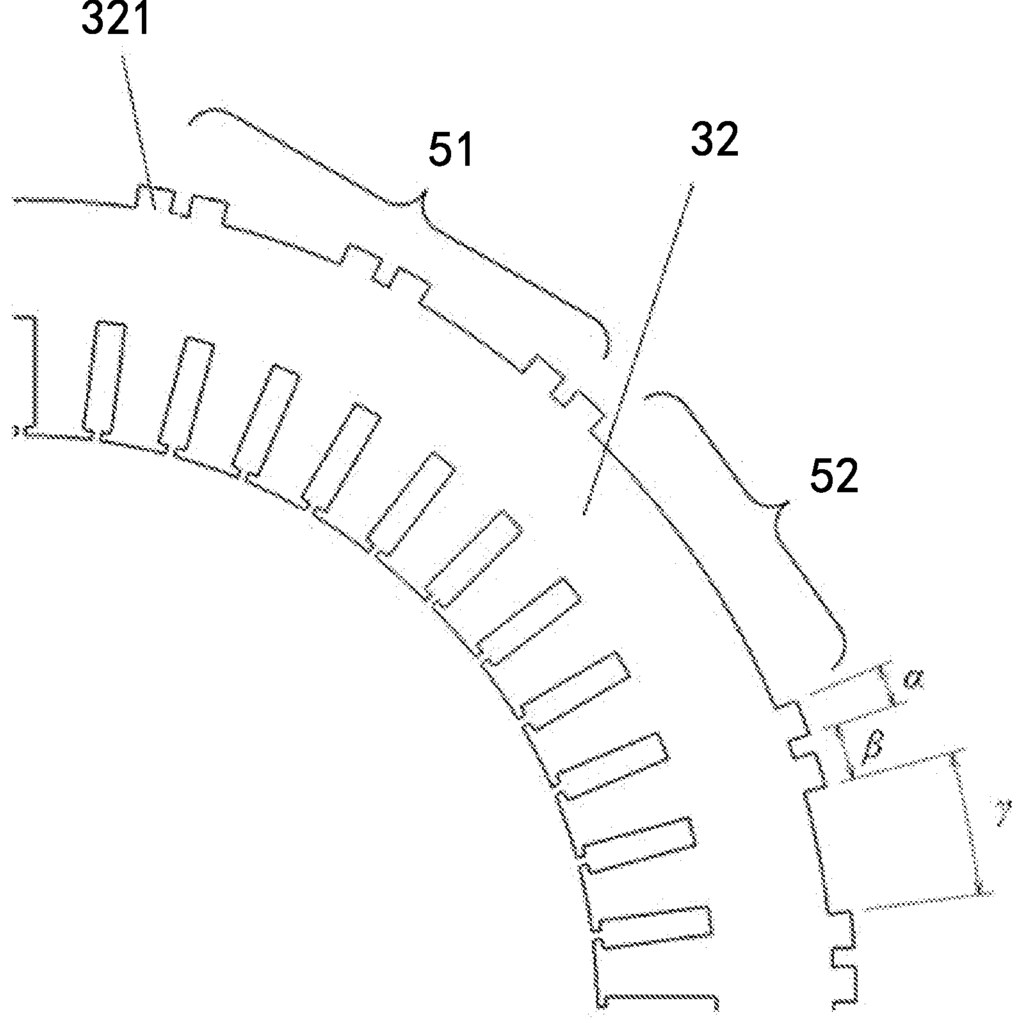
FIG. 5 is a partially enlarged diagram of the core punch in FIG. 4*b*.

FIG. 5 is a partially enlarged diagram of the core punch in FIG. 4*b*. The diversion region 51 includes a plurality of sub-diversion regions. Tabs 321 arranged at the outer periphery of the second core punch 32 are centrally distributed in said plurality of sub-diversion regions. Each tab 321 extends a second circumferential angle $\alpha$ in a circumferential direction. The angle between corresponding sides of adjacent tabs 321 is a third circumferential angle 13. The angle between adjacent sub-diversion regions is a fourth circumferential angle $\gamma$. n tabs 321 are included in each sub-diversion region. The cooling system satisfies: $\gamma>(n-1)*13+\alpha$.

Figure 6:
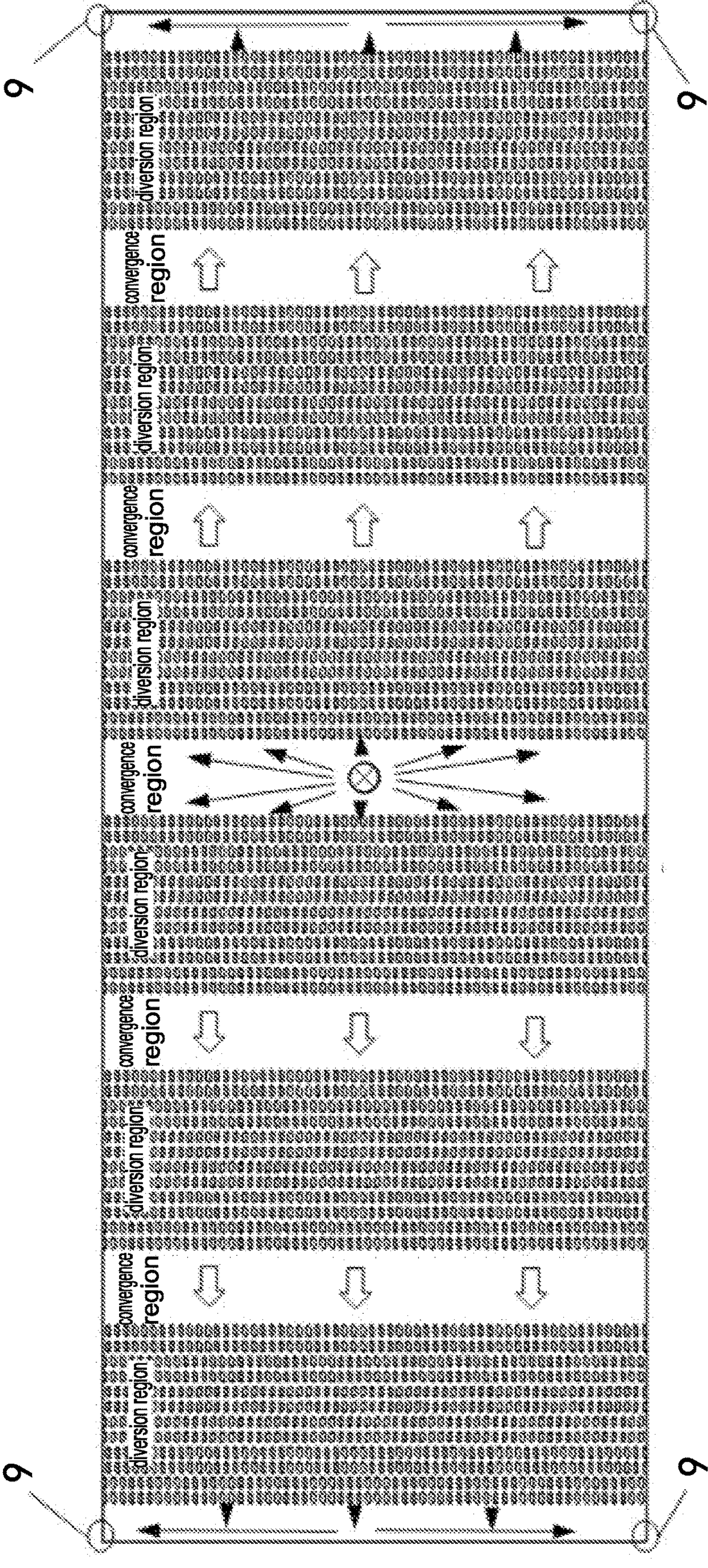
FIG. 6 is a diagram of the circumferential expansion of the outer circumference of the stator core of FIG. 1.

FIG. 6 is a diagram of the circumferential expansion of the outer circumference of the stator core in FIG. 1. During flow through the flow guiding configuration 5 at the outer periphery of the stator core 3, the coolant is subdivided into multiple paths and flows in parallel in the diversion region 51. The coolant then converges in the convergence region 52 and finally flows out of the convergence port 9. Each parallel branch is of the same length and has the same resistance to interlaced disturbance flow. The multiple parallel paths ensure an even distribution of the coolant while reducing the resistance to the coolant flow.

Figure 7:
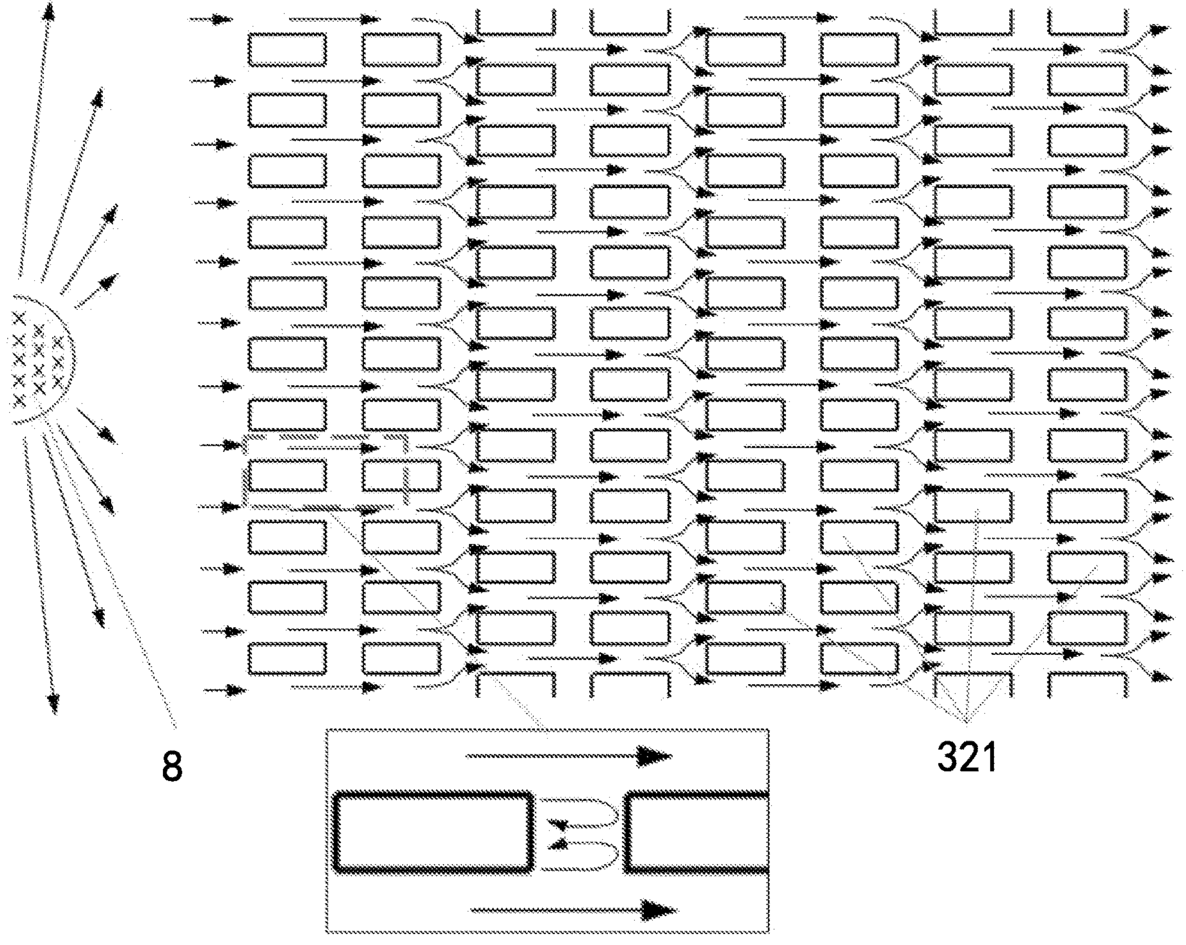
FIG. 7 is a partially enlarged diagram of the diversion region on the outer periphery of the stator core of FIG. 6.

FIG. 7 is a partially enlarged diagram of the diversion region on the outer circumference of the stator core in FIG. 6. The coolant impinges on the staggered tabs 321 thereby performing complex fluid motion and increasing the heat dissipation coefficient of the coolant relative to the heat transfer surface on the outer circumference of the stator core 3, resulting in a significant increase in heat dissipation efficiency.

Figure 8A:
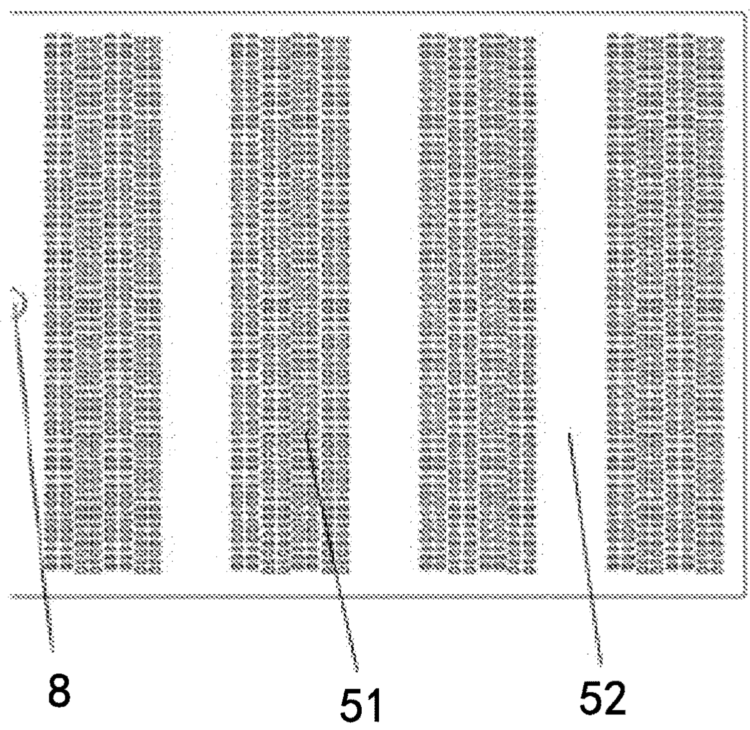
FIGS. 8*a* and 8*b* are diagrams of the circumferential expansion of the outer circumference of a stator core according to other embodiments.
Figure 8B:
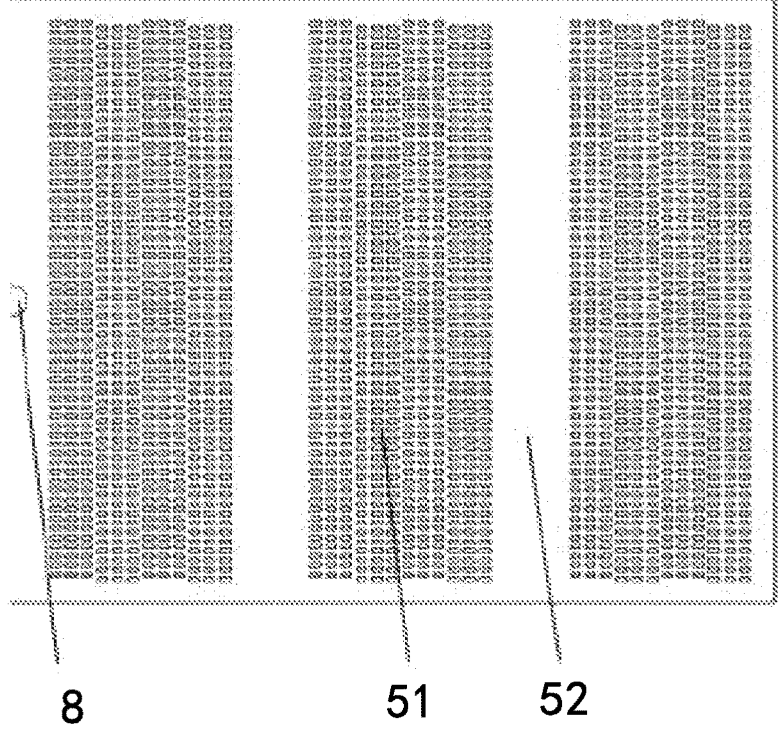

FIGS. 8*a* and 8*b* are diagrams of the circumferential expansion of the outer circumference of the stator core according to other embodiments. The number and grouping of tabs 321 on the second core punch 32 can be varied according to practical needs (e.g., the size and power rating of the drive motor 1, etc.).

Figure 9A:
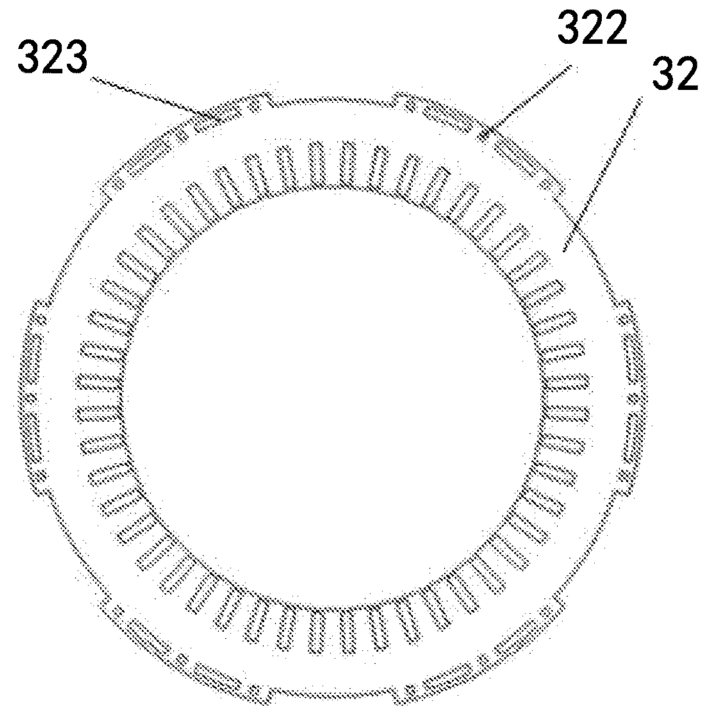
FIGS. 9*a* and 9*b* are diagrams of a second core punch according to other embodiments.

FIG. 9*a* is a diagram of a second embodiment of the second core punch. In the second embodiment, the second core punch 32 is annular in shape. A slot arranged on the second core punch 32 is used to form a convergence region 52. A tab 321 arranged on the second core punch 32 extends in a circumferential direction and includes a plurality of holes therein. Said plurality of holes includes a short hole 322 and a medium-length hole 323 for forming a diversion region 51. The circumferential angle between adjacent holes is a second circumferential angle α. The circumferential angle of the short hole 322 is the difference between a third circumferential angle β and the second circumferential angle α. The circumferential angle of the medium-length hole 323 is a fourth circumferential angle γ.

Figure 9B:
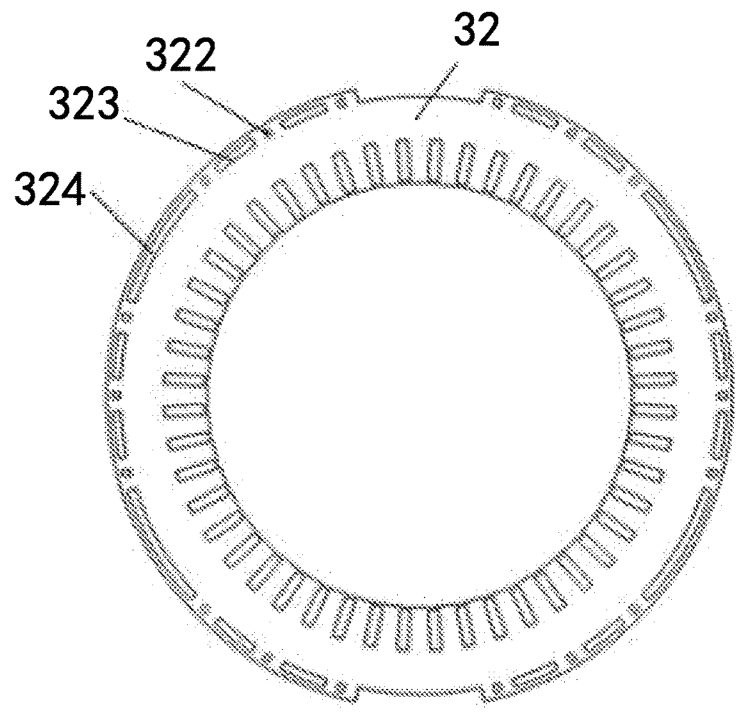

FIG. 9*b* is a diagram of a third embodiment of the second core punch. In the third embodiment, the second core punch 32 is annular in shape. The slots arranged on the second core punch 32 are at the uppermost and lowermost along the vertical direction. Tabs 321 extend from the uppermost slot to the lowermost slot along the circumferential direction. The tab 321 includes a short hole 322, a medium-length hole 323 and a long hole 324. The short hole 322 and the medium-length hole 323 are used to form a diversion region 51, while the long hole 324 and the uppermost and lowermost slots along the vertical direction are used to form a convergence region 52. The circumferential angle between adjacent holes in the tab 321 is a second circumferential angle α. The circumferential angle of the short hole 322 is the difference between a third circumferential angle β and the second circumferential angle α. The circumferential angle of the medium-length hole 323 is a fourth circumferential angle γ.

Figure 10:
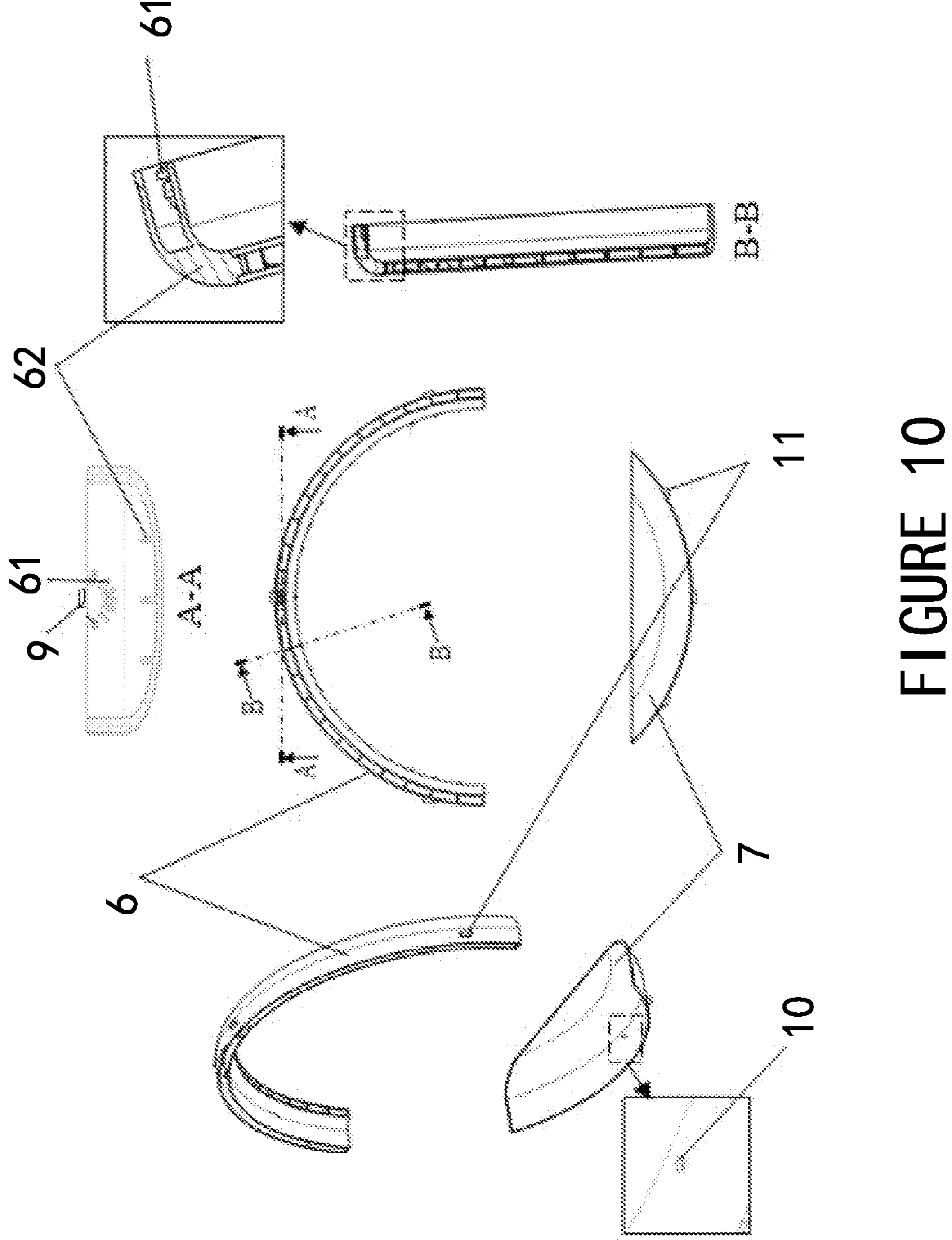
FIG. 10 is a diagram of a cooling structure for cooling the end windings of the cooling system of FIG. 1.

FIG. 10 is a diagram of a cooling structure for cooling the end windings of the cooling system of FIG. 1. The flow guiding hood 6 comprises a diversion boss 61 arranged close to the convergence port 9. The diversion boss 61 is a protruding feature on the inner surface of the flow guiding hood 6 and comprises a plurality of diversion ribs protruding from the inner surface of the flow guiding hood 6 towards the outer circumference of the stator core 3. The diversion ribs are used to evenly disperse the coolant flowing through the convergence port 9 over the entire circumferential area of the flow guiding hood 6.

The flow guiding hood 6 includes a plurality of flow guiding strips 62 which protrude along the inner surface of the flow guiding hood 6 and extend from the flow guiding hood 6 toward the flow accumulating hood 7, as best seen in their cross-sectional profile in section A-A of FIG. 10. The two-headed arrow labeled 62 in the main view of FIG. 10 indicates these structures, which are more clearly depicted as strips in section A-A. These strips are for causing the coolant flowing from the convergence port 9 to flow along the orientation of the flow guiding hood 6 and the flow guiding strips 62 and fall uniformly to the ends of the stator windings 4.

There are no special sealing requirements for the installation of the flow guiding hood 6 and the flow accumulating hood 7, and they are installed as follows: first, a mounting catch 11 is arranged at the position where the two are in contact with the end of the motor housing 2 or the stator core 3, and corresponding holes are arranged on the end of the motor housing 2 or the stator core 3 for mounting and fixing; then an end ring is arranged at the end of the stator core 3, and the flow guiding hood 6 and the flow accumulating hood 7 are attached to the end ring.

Figure 11:
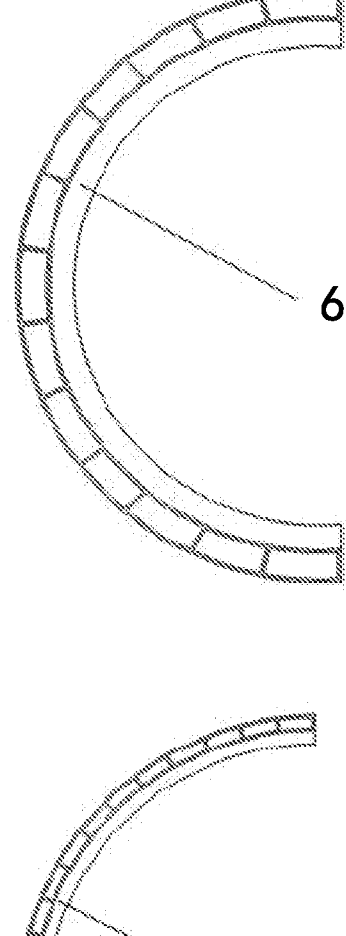
FIG. 11 is a diagram of a flow guiding hood according to other embodiments.
Figure 11:

FIG. 11 is a diagram of a flow guiding hood according to other embodiments. The number, angle and spacing of the flow guiding strips 62 can be varied to accommodate different cooling needs of the ends of the stator winding 4.

Although the present application is shown and described based on particular embodiments, the present application is not limited to the details shown. Rather, various details of the present application may be adapted within the scope of the claims and equivalent substitutions thereof.

The invention claimed is:

1. A cooling system for a drive motor (1) of an alternative fuel vehicle, wherein said drive motor comprises a motor housing (2), a stator core (3) arranged in said motor housing, and a stator winding (4) arranged inside said stator core, wherein said stator core is formed by a lamination of first core punches (31) and second core punches (32), characterized in that, said cooling system comprises:

a flow guiding configuration (5) positioned at the outer periphery of said stator core, forming a connected space by means of a hole or slot in the outer periphery of said stator core for directing a coolant flow at the outer periphery of said stator core to cool said stator core, said flow guiding configuration comprising alternately arranged diversion regions (51) and convergence regions (52), wherein said diversion regions are configured to divide a coolant flow path into multiple paths and said convergence regions are regions where the multiple paths meet;

wherein said flow guiding configuration is formed by a lamination of said second core punches;

wherein said second core punch is arranged with slots for forming said convergence regions, and with a tab arranged on said second core punch;

wherein said tab extends in a circumferential direction and comprises a plurality of holes therein, said plurality of holes comprising a short hole (322) and a medium-length hole (323) for forming said diversion region;

wherein a circumferential angle between adjacent said holes is a second circumferential angle α;

wherein a circumferential angle of said medium-length hole is a fourth circumferential angle γ;

one or more coolant inlets (8) arranged on said motor housing in connection with said convergence regions, for introducing the coolant from outside said cooling system to the outer periphery of said stator core, a flow guiding hood (6) mounted in said motor housing, extending away from said stator core from the end of said stator core for directing the coolant flow to the end of said stator winding to cool the end of said stator winding, wherein said flow guiding hood only covers a portion of the upper part of the winding end of said stator core along the vertical direction, and wherein said flow guiding hood extends a distance along the axial direction of said stator core less than the distance that said end of said stator winding extends along the axial direction of said stator core outside of said stator core, and a convergence port (9) positioned in the upper part of the end of said stator core along the vertical direction, wherein the convergence port is formed by a lamination of said first core punch (31) at the end of the stator core and is configured to receive coolant that has flowed through the flow guiding configuration and direct the coolant into said flow guiding hood, thereby creating a serial flow path in which coolant first cools the outer periphery of the stator core and subsequently cools the end of the stator winding.

2. The cooling system according to claim 1, wherein said cooling system further comprises:

a flow accumulating hood (7) mounted in said motor housing and attached to an end pressure plate formed by said second core punch on the end of said stator core, extending away from said stator core from the end of said stator core for receiving a portion of the coolant falling from the end of said stator winding, wherein said flow accumulating hood only covers a portion of the lower part of the winding end of said stator core along the vertical direction, said flow accumulating hood extends along the axial direction of the stator core for a greater distance than the end portion of said stator winding extends along the axial direction of said stator core outside said stator core, and a coolant outlet (10) arranged at the bottom of said flow accumulating hood for exporting the coolant from said flow accumulating hood to avoid prolonged immersion of the coolant in said drive motor during the cessation of operation of said drive motor, wherein said flow accumulating hood is configured such that the coolant therein flows from said coolant outlet, or such that the coolant overflows from said flow accumulating hood after filling said flow accumulating hood.

3. The cooling system according to claim 2, wherein said flow guiding hood is a hollow structure and comprises a plurality of diversion bosses (61), each boss comprising one or more protruding ribs, and a plurality of flow guiding strips (62) for uniformly dispersing the coolant flowing into said flow guiding hood into a circumferential area inside said flow guiding hood along the orientation of said flow guiding hood, wherein said flow guiding strips protrude from the interior of said flow guiding hood along the inner surface of said flow guiding hood and extend toward said flow accumulating hood for causing the coolant passing through said diversion bosses to flow along the orientation of said flow guiding hood or said flow guiding strip and fall to the end of said stator winding.

4. The cooling system according to claim 1, wherein the coolant in said flow guiding hood is distributed directly by a motor oil pump.

5. The cooling system according to claim 1, wherein adjacent said second core punches are deflected by a first circumferential angle along the circumference direction of said stator core.

6. The cooling system according to claim 5, wherein said diversion region comprises a plurality of sub-diversion regions, said tabs are centrally distributed in said plurality of sub-diversion regions, the number of said tabs included in each sub-diversion region is n being not less than 1, each of said tabs extends a second circumferential angle ($\alpha$) along the circumferential direction, the angle between the corresponding sides of adjacent said tabs is a third circumferential angle ($\beta$), and the angle between adjacent said sub-diversion regions is a fourth circumferential angle ($\gamma$).

7. The cooling system according to claim 6, wherein said cooling system is configured to satisfy: $\gamma>(n-1)*\beta+\alpha$, where $n\geq1$, and said convergence regions extends along the circumference direction at a circumferential angle not less than the fourth circumferential angle $\gamma$.

8. The cooling system according to claim 7, wherein adjacent said diversion regions are spaced from each other at a circumferential angle for forming said convergence regions.

* * * * *